(12) United States Patent
Chappell

(10) Patent No.: US 7,003,399 B1
(45) Date of Patent: Feb. 21, 2006

(54) GAS JET CONTROL FOR INERTIAL MEASUREMENT UNIT

(75) Inventor: Charles D. Chappell, Treasure Island, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/004,214

(22) Filed: Dec. 3, 2004

Related U.S. Application Data

(60) Provisional application No. 60/608,819, filed on Sep. 10, 2004.

(51) Int. Cl.
*G01C 21/26* (2006.01)

(52) U.S. Cl. ............. 701/220; 73/178 R; 73/488; 73/493; 73/510

(58) Field of Classification Search ........ 701/200, 701/207, 210, 220, 214; 73/178 R, 488, 73/493, 504, 510
See application file for complete search history.

(56) References Cited

U.S. PATENT DOCUMENTS

| 3,576,124 | A | * | 4/1971 | O'Connor | 73/1.78 |
|---|---|---|---|---|---|
| 5,067,084 | A | * | 11/1991 | Kau | 701/220 |
| 5,088,825 | A | * | 2/1992 | Derry et al. | 356/476 |
| 5,357,437 | A | * | 10/1994 | Polvani | 701/207 |
| 6,741,209 | B1 | * | 5/2004 | Lee | 342/463 |
| 6,826,478 | B1 | * | 11/2004 | Riewe et al. | 701/220 |

* cited by examiner

*Primary Examiner*—Richard M. Camby
(74) *Attorney, Agent, or Firm*—Fogg & Associates, LLC

(57) ABSTRACT

An inertial navigation system is provided. The system includes a gas supported sensor block that is adapted to rotate in three dimensions in a near frictionless environment, a plurality of jet plates adapted to receive two or more pairs of opposing pneumatic nozzles and a plurality of electronically controlled pneumatic valves that provides and controls gas to the opposing pair of pneumatic nozzles. Each pair of opposing pneumatic nozzles is directed at an exterior surface of the sensor block and uses gas flow to move and hold the sensor block in any rotational location without physically touching the sensor block.

45 Claims, 5 Drawing Sheets

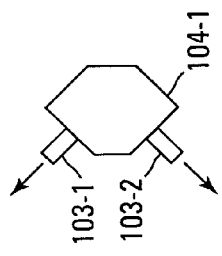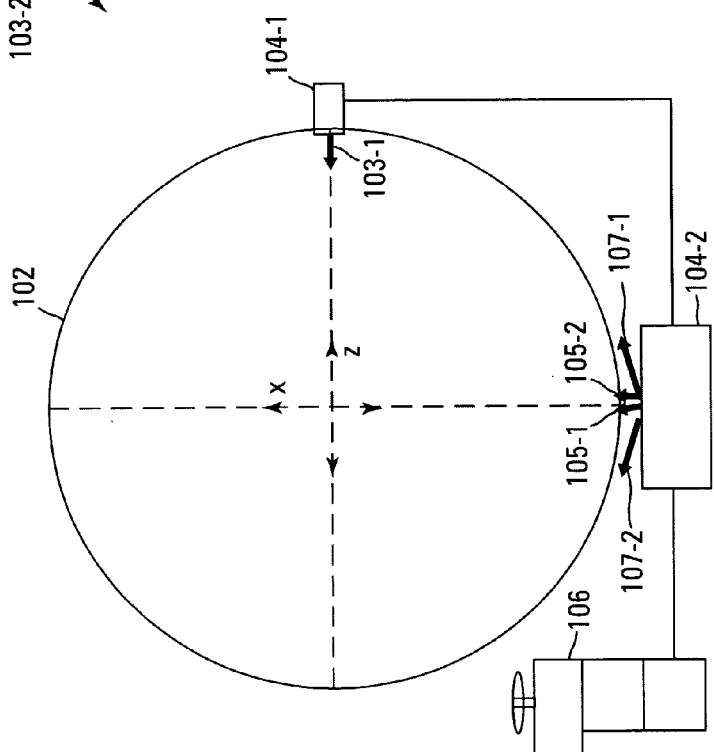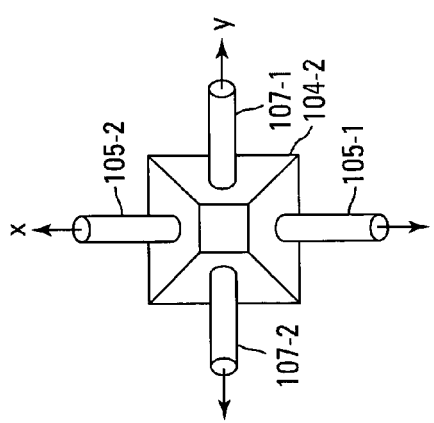

GAS JET CONTROL FOR INERTIAL MEASUREMENT UNIT

CROSS REFERENCE TO OTHER APPLICATIONS

This application is related to, and claims the benefit of the filing date of U.S. Provisional Application No. 60/608,819, filed on Sep. 10, 2004.

This application is related to co-pending U.S. patent application Ser. No. 11/004,184, filed on Dec. 3, 2004 and entitled "GAS SUPPORTED INERTIAL SENSOR SYSTEM AND METHOD" (the '6540 Application). The '6540 Application is incorporated herein by reference.

This application is also related to the following applications filed on even date herewith, all of which are hereby incorporated herein by reference:

U.S. patent application Ser. No. 11/004,759, entitled "ABSOLUTE POSITION DETERMINATION OF AN OBJECT USING PATTERN RECOGNITION";

U.S. patent application Ser. No. 11/004,743, entitled "PRECISE, NO-CONTACT, POSITION SENSING USING IMAGING";

U.S. patent application Ser. No. 11/004,531, entitled "SPHERICAL POSITION MONITORING SYSTEM";

U.S. patent application Ser. No. 11/004,529, entitled "THREE DIMENSIONAL BALANCE ASSEMBLY";

U.S. patent application Ser. No. 11/004,452, "ARTICULATED GAS BEARING SUPPORT PADS";

U.S. patent application Ser. No. 11/004,177, entitled "RF WIRELESS COMMUNICATION FOR DEEPLY EMBEDDED AEROSPACE SYSTEMS"; and U.S. patent application Ser. No. 11/004,517, entitled "GENERALIZED INERTIAL MEASUREMENT ERROR REDUCTION THROUGH MULTIPLE AXIS ROTATION DURING FLIGHT".

TECHNICAL FIELD

The present invention generally relates to inertial measurement units and in particular to control of inertial measurement units.

BACKGROUND

Inertial navigation systems (INS) are used in civil and military aviation, missiles and other projectiles, submarines and space technology as well as a number of other vehicles. INSs measure the position and attitude of a vehicle by measuring the accelerations and rotations applied to the system's inertial frame. INSs are widely used because it refers to no real-world item beyond itself. It is therefore resistant to jamming and deception.

An INS may consist of an inertial measurement unit combined with control mechanisms, allowing the path of a vehicle to be controlled according to the position determined by the inertial navigation system. A typical INS uses a combination of accelerometers and any number of control devices.

INSs have typically used either gyrostablized platforms or 'strapdown' systems. The gyrostabilized system allows a vehicle's roll, pitch and yaw angles to be measured directly at the bearings of gimbals. One disadvantage of this scheme is that it employs multiple expensive precision mechanical parts. It also has moving parts that can wear out or jam, and is vulnerable to gimbal lock. In addition, for each degree of freedom another gimbal is required thus increasing the size and complexity of the INS.

INSs require periodic rotation to calibrate instruments. There is a need for rotational control of INSs without the use of conventional torque motors eliminating complex parts that add weight, size and cost to the INS assembly. A traditional method of rotating an INS for calibration is to torque it about an axis using electromagnetic motors on a ball bearing supported gimbal axis. A disadvantage of this method is that it employs multiple expensive precision mechanical parts. It also has moving parts that can wear out or jam, and is vulnerable to gimbal lock. Another problem of this system is that for each degree of freedom another gimbal is required thus increasing the size of the inertial system.

Another type of inertial navigation system is one that floats a sensor assembly with neutral bouyancy in a fluid. This method requires an extremely complex assembly, sensitive temperature control and obvious sealing challenges that add considerably to the cost of deployment and maintenance. Also, many of these fluids are hazardous or require a high degree of purity.

For the reasons stated above and for other reasons stated below which will become apparent to those skilled in the art upon reading and understanding the present specification, there is a need in the art for a guidance system which is inexpensive and easy to move in all directions without having parts that wear out or require extensive maintenance.

SUMMARY

An inertial navigation system is provided. The system includes a gas supported sensor block that is adapted to rotate in three dimensions in a near frictionless environment, a plurality of jet plates adapted to receive one or more pairs of opposing pneumatic nozzles and a plurality of electronically controlled pneumatic valves that provides and controls gas to the opposing pair of pneumatic nozzles. Each pair of opposing pneumatic nozzles is directed at an exterior surface of the sensor block and uses gas flow to move and hold the sensor block in any rotational location without physically touching the sensor block.

A gas jet control apparatus is provided. The apparatus includes three pairs of opposing pneumatic nozzles, wherein each of the three pairs of opposing pneumatic nozzles operates in axes orthogonal to each other. The three pairs of pneumatic nozzles receive gas from electronically controlled pneumatic valves. The gas is provided to rotate and hold an inertial measurement unit at any rotational angle without physically contacting the inertial measurement unit. The inertial measurement unit is floated in a near frictionless environment. The apparatus further includes a first jet plate adapted to receive two of the pairs of opposing pneumatic nozzles and a second jet plate adapted to receive a third pair of opposing pairs of pneumatic nozzles.

A method of controlling rotation of an inertial measurement unit is provided. The method includes floating an inertial measurement unit in a near frictionless environment, directing opposing pairs of pneumatic nozzles at an exterior surface of the inertial measurement unit in three orthogonal axis and driving gas through one or more of the opposing pairs of pneumatic nozzles and moving the inertial measurement unit in a desired manner within three dimensions.

DRAWINGS

Features and advantages of the present invention will become apparent to those skilled in the art from the following description with reference to the drawings, in which:

FIG. 1A is a block diagram of one embodiment of a gas jet control system.

FIG. 1B is a block diagram of one embodiment of a gas jet plate assembly.

FIG. 1C is a block diagram of another embodiment of a gas jet plate assembly.

DETAILED DESCRIPTION

Figure 2:
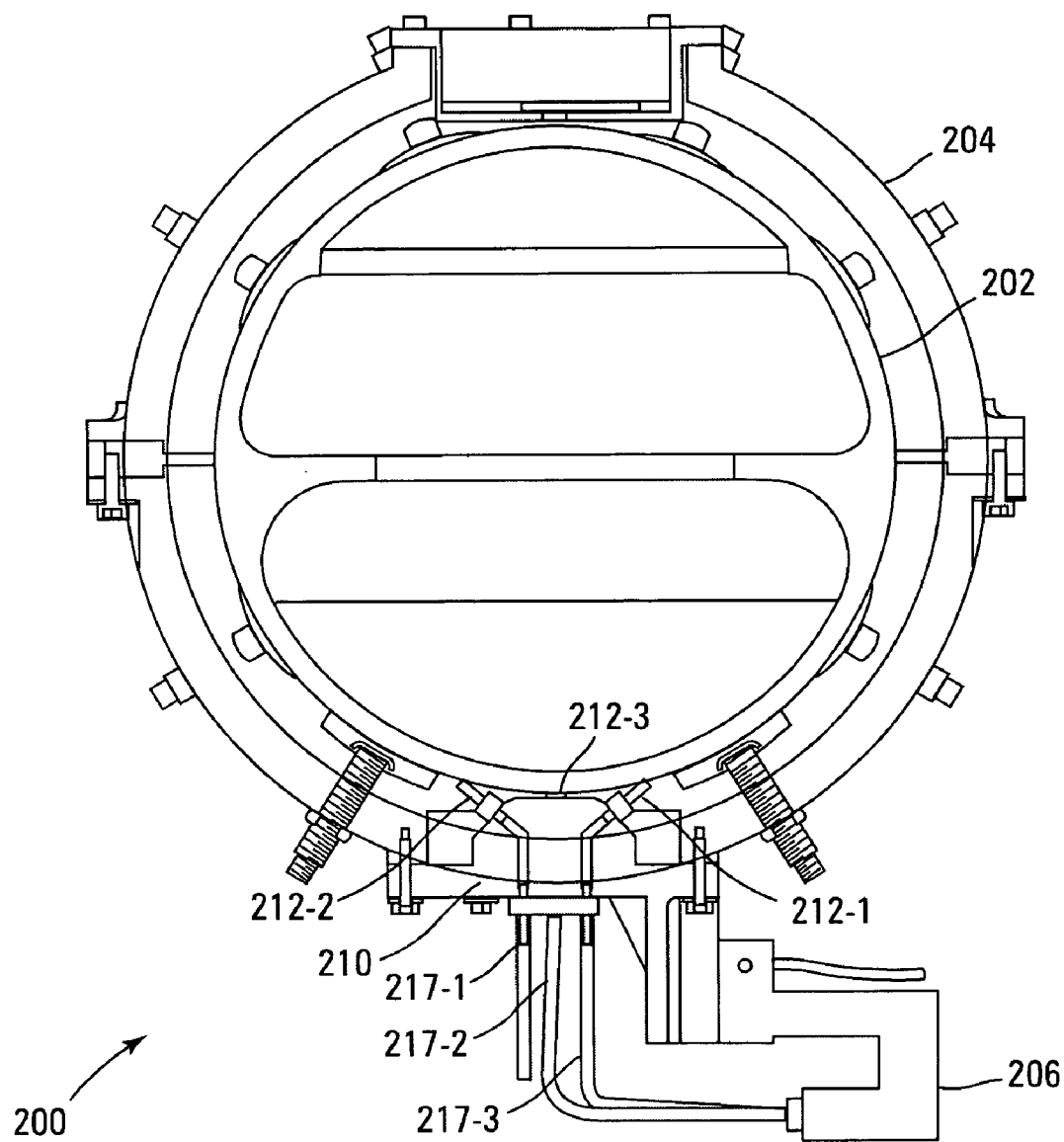
FIG. 2 illustrates a cut away view of one embodiment of an inertial navigation system.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a gas jet control assembly for an inertial measurement unit. This gas jet control assembly provides rotation necessary for high accuracy guidance systems when calibrating their instruments. The gas jet control assembly provides rotational control without the use of conventional torque motors by utilizing directed gas jets. The gas jets of the present invention are capable of controlling the angular position of a mulitaxis inertial measurement unit (IMU) without physically touching or being attached to any single axis of the IMU and can rotate the IMU in all directions. Embodiments of the present invention eliminate complex parts that add weight, size and cost to the IMUs. The reduction of these parts in turn increases the reliability of the system.

FIG. 1A is a block diagram that illustrates one embodiment of a gas jet control system shown generally at 100. In this embodiment, a sensor block assembly 102 is rotated by gas streams from jet plate assemblies 104-1 and 104-2. Jet plate assemblies 104-1 to 104-2 use gas flow to rotate sensor block assembly 102 in three axes. In one embodiment, the gas used is nitrogen, air, or the like. In one embodiment, jet plate assembly 104-2 includes 2 pairs of opposing nozzles 105-1, 105-2 and 107-1 and 107-2, further illustrated in FIG. 1C, with each pair of opposing nozzles 105 and 107 operating orthogonally to the other pair. For example in one embodiment, a first pair of opposing nozzles 105 operates in the x-axis and the second pair of opposing nozzles 107 operates in the y-axis wherein the x and y axis are orthogonal to each other. In this embodiment, jet plate assembly 104-2 includes 1 pair of opposing nozzles 103-1 and 103-2, further illustrated in FIG. 1B, and operates in a third axis, z-axis, which is orthogonal to each of the other two axes, x and y.

Gas used by jet plate assemblies 104-1 to 104-R is turned on and off using valves 106. In one embodiment, valves 106 are electronically controlled pneumatic valves such as solenoid actuated pneumatic valves or the like.

Electrically controlled pneumatic valves 106 are controlled by a controller 108 that turns gas on and off to each nozzle 103-1, 103-2, 105-1, 105-2, 107-1, and 107-2 as needed for a given rotation command. In on embodiment, valves 106 pulse gas through jet plates 104-1 and 104-2. This allows sensor block 102 to be rotated and held at any desired location in three axes.

Each nozzle of pairs of nozzles 103, 105, and 107 is aligned to allow air flowing through nozzles 103-1, 103-2, 105-1, 105-2, 107-1 and 107-2, and 107 to move sensor block 102 in a particular direction and an opposing nozzle of a pair of nozzles 103, 105 and 107 to move the sensor block 102 in the opposite direction. This allows movement of sensor block 102 in any rotational location in three dimensions and sensor block 102 to be arrested and held in place at any location.

FIG. 2 illustrates a cut away view of one embodiment of an inertial navigation system shown generally at 200. Inertial navigation system 200 includes an inertial measurement unit or spherical sensor block 202 and an outer shell 204 that floats sensor block 202 in a near frictionless environment to allow motion in all directions. Embodiments of the inertial navigation system and spherical sensor block 202 are described in related application Honeywell 11/004184 entitled "AIR SUPPORTED INERTIAL SENSOR ASSEMBLY" and filed on even date herewith.

In one embodiment, inertial navigation system 200 includes two or more jet plates assemblies 210. In one embodiment, jet plate assemblies 210 are as described with respect to jet plates 104 of FIGS. 1A–1C above. Due to the orientation of FIG. 2 a second jet plate assembly, located about the equator of sensor block 202, is not visible but is a described above with respect to FIGS. 1A–1C. Jet plate assembly 210 includes 4 nozzles 212 that provide directional gas flow to rotate, stop, and hold spherical sensor block 202 into any rotational location. Due to the orientation of FIG. 2 only nozzles 212-1, 212-2 and 212-3 are visible.

Inertial navigation system 200 further includes a plurality of valves 206. In one embodiment, valves 206 are electronically controlled pneumatic valves such as solenoid actuated pneumatic valves or the like. Valves 206 are controlled by a controller unit such as controller 108 described in FIG. 1A above. Each nozzle 212 of jet plate assembly 210 is coupled to one or more valves 206. In operation, one or more of valves 206 provide pressurized gas to one or more nozzles 212 to rotate spherical sensor block 202. Nozzles 212 are angled to rotate sensor block assembly 202 in forward and reverse directions in opposing pairs in two orthogonal axes. The addition of another jet plate assembly such as 104-1 described with respect to FIG. 1 above provides a third pair of opposing nozzles directed to rotate sensor block 202 in a third orthogonal axis.

Each nozzle 212 is connected to an associated gas line 217. As discussed above due to the cut away illustration, only three of four gas lines 217-1, 217-2 and 217-3 are visible. Each of gas lines 217 are coupled to valves 206. In operation, valves 206 respond to control signals and regulate the gas to each nozzle to reposition senor block 202 and hold at precise angles.

Figure 3:
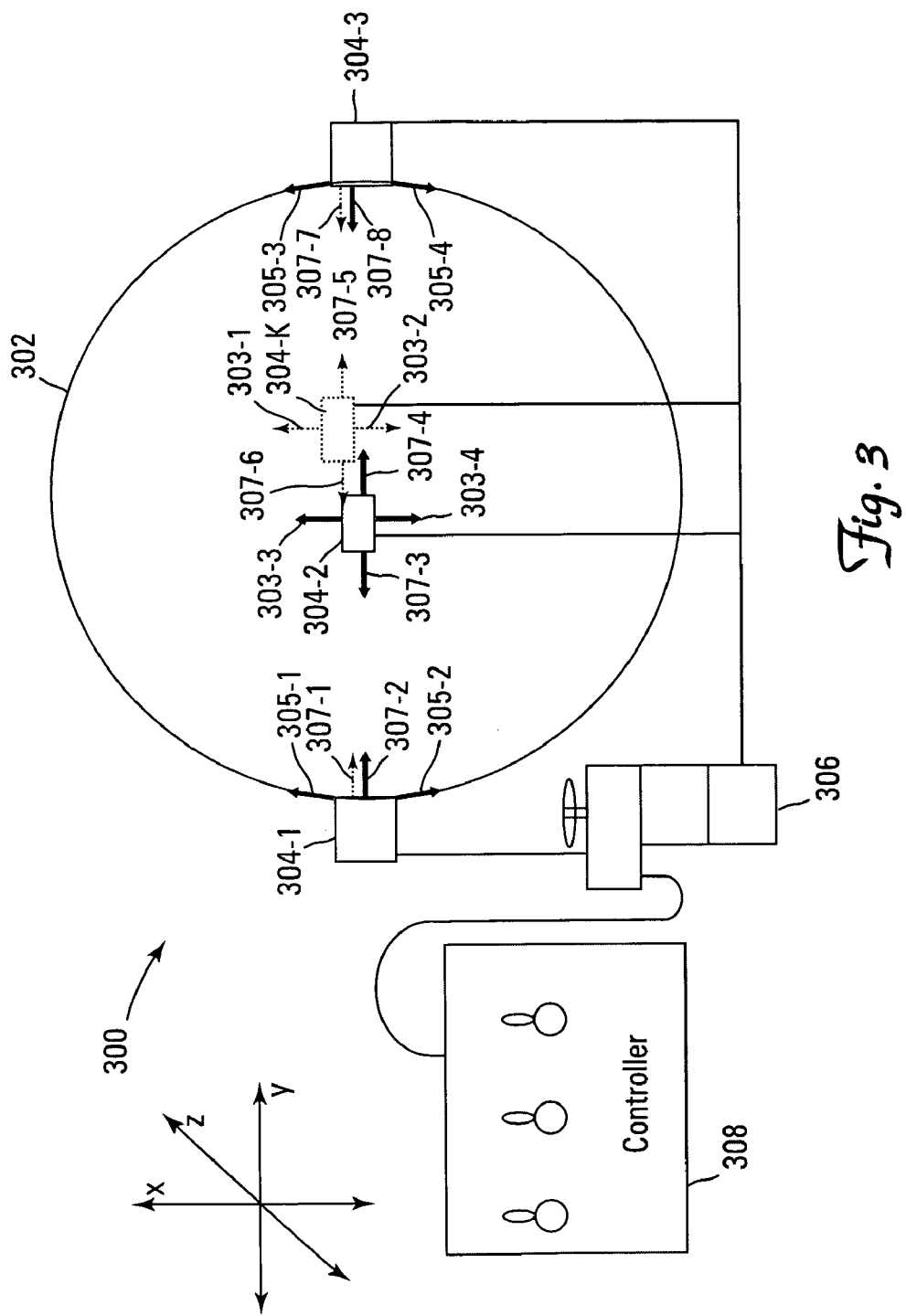
FIG. 3 is a block diagram that illustrates another embodiment of a gas jet control system.

FIG. 3 is a block diagram that illustrates another embodiment of a gas jet control system shown generally at 300. Gas jet control system 300 includes a sensor block 302 and a plurality of jet plate assemblies 304-1 to 304-K coupled to a plurality of valves 306 coupled to a controller 308. In this embodiment, a sensor block assembly 302 is rotated by gas streams from jet plate assemblies 304-1 to 304-K. Jet plate assemblies 304-1 to 304-K use gas flow to rotate sensor block assembly 302 in three orthogonal axes. In one embodiment, the gas used is nitrogen, air, or the like. In one embodiment, each jet plate assembly 304 includes 2 pairs of opposing nozzles. For example jet plate assembly 304-1 includes a first pair of opposing nozzles 305-1 and 305-2 and a second pair of opposing nozzles 307-1 and 307-2 with each pair of opposing nozzles 305 and 307 operating to rotate sensor block 302 orthogonally to the resultant rotation caused by the other pair. A second jet plate assembly 304-2 includes 2 pairs of opposing nozzles 303-3, 303-4 and 307-3, 307-4. A third jet plate assembly 304-3 includes 2 pairs of opposing nozzles 307-7, 307-8 and 305-3, 305-4. A forth jet plate assembly 304-K includes 2 pairs of opposing nozzles 303-1, 303-2 and 307-5, 307-6. It is understood that any number of jet plate assemblies may be used to rotate, stop and hold sensor block 302 in any rotational location and the jet assemblies may be located at any location about sensor block 302.

Opposing pairs of nozzles 305 operate in the y axis. Opposing pair of nozzles 307 operate in the z axis. Opposing pairs of nozzles 303 operate in the x axis. Each axis is orthogonal to each other. As a result each opposing pairs of nozzles 303, 305, and 307 operate to rotate sensor block 302 orthogonally to each other.

In one embodiment, jet plate assemblies 304-1 to 304-K are as described above with respect to jet assembly 104-2 of FIGS. 1A and 1C.

Gas used by jet plate assemblies 304-1 to 304-K is turned on and off using one or more valves 306. In one embodiment, valves 306 are electronically controlled pneumatic valves such as solenoid actuated pneumatic valves or the like. Valves 306 are operated by a controller 308 that provides signals that control the amount and flow of gas via valves 306 to pulse gas through jet plates 304-1 to 304-K. This allows sensor block 302 to be rotated and held at any desired location in the three axes x, y, and z.

Each nozzle of pairs of nozzles 303, 305, and 307 is aligned to allow air flowing through nozzles 303-1 to 303-4, 305-1 to 305-4, and 307-1 to 307-6 to move sensor block 302 in a particular direction and opposing nozzles of a pair of nozzles 303, 305 and 307 to move sensor block 302 in the opposite direction. This allows movement of sensor block 302 in any rotational location in three dimensions and sensor block 302 to be arrested and held in place at any location.

In one embodiment gas jet assemblies 304-1 to 304-K surround sensor block 302 on the same plane with each gas jet assembly being comprised of four nozzles (two opposing pairs) angled toward the surface with each pair in opposing directions. This results in the use of 16 gas jets and provides for a great amount of torque and control of the rotation of the sensor block assembly.

Figure 4:
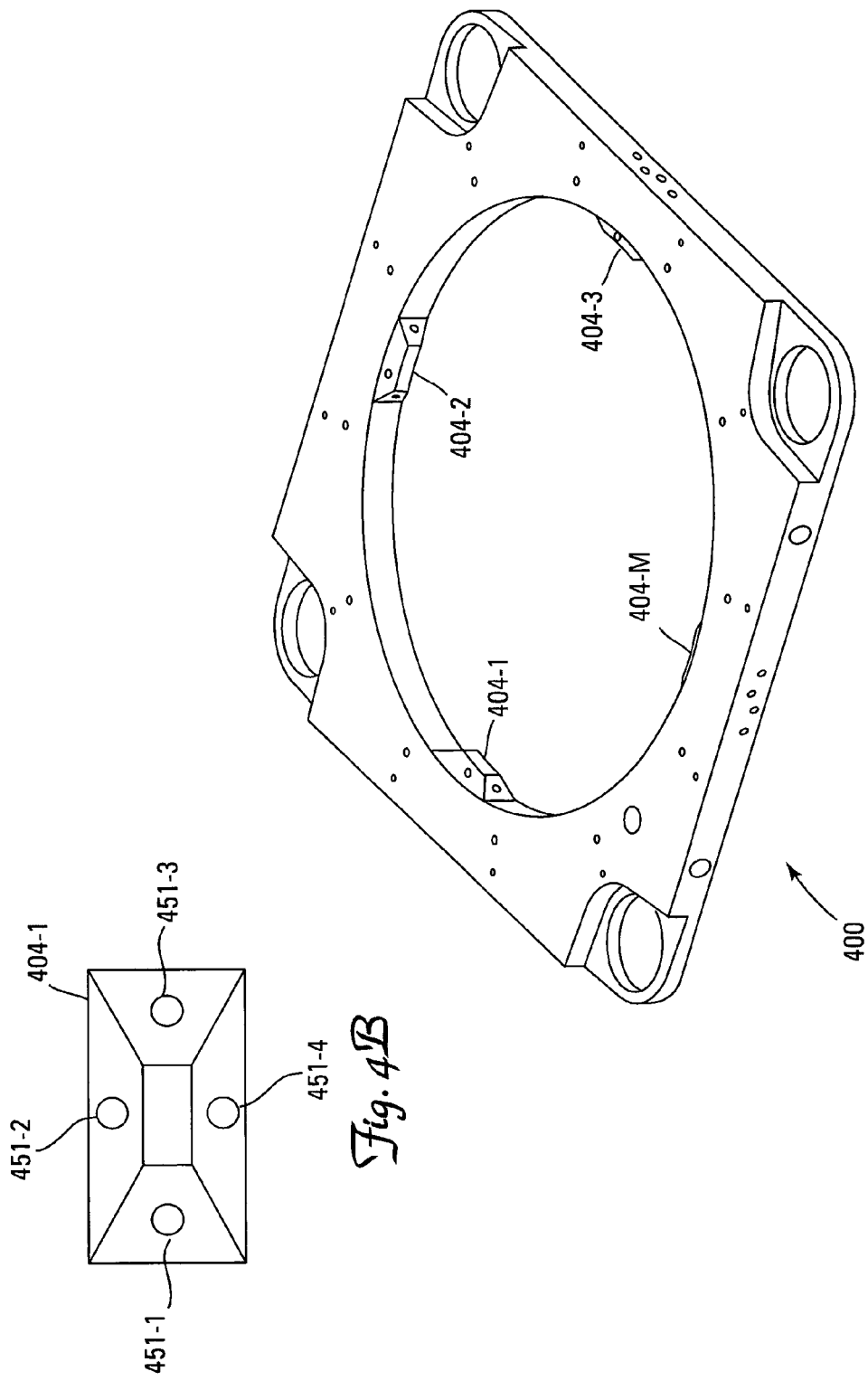
FIG. 4A illustrates a mid-plate for an inertial navigation system.
FIG. 4B is a block diagram of an embodiment of a gas jet plate assembly.
Figure 5:
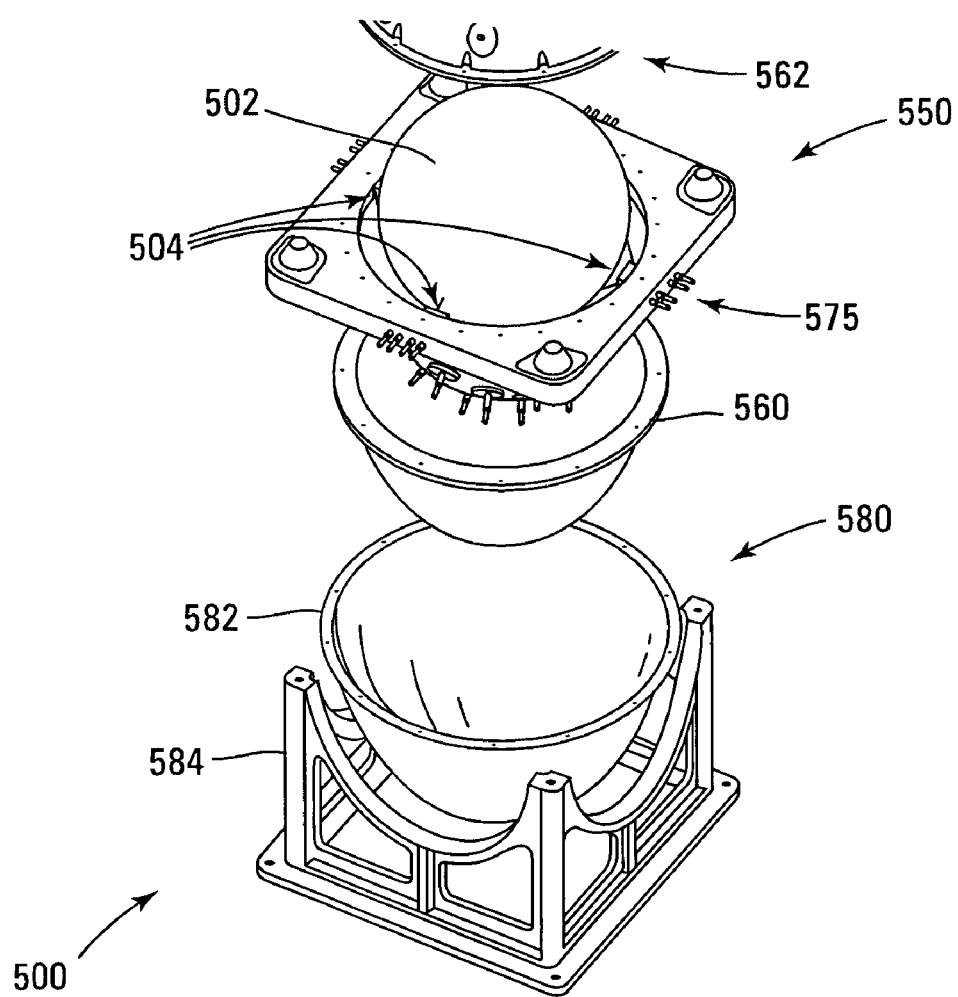
FIG. 5 illustrates one embodiment of an inertial navigation system.

FIG. 4A illustrates a mid-plate for an inertial navigation system shown generally at 400. Mid-plate 400 includes a plurality of jet plate assemblies 404-1 to 404-M. Jet plate assemblies 404 are as described above with respect to jet plate assemblies 104 of FIGS. 1A–1C and jet plate assemblies 304 of FIG. 3, or a combination of each. Each of the jet plate assemblies 404 includes one or more pairs of gas jets 451 as illustrated in FIG. 4B. Each gas jet 451-1 to 451-4 is designed to receive a gas nozzle. The gas nozzles are not shown but are as discussed above with respect to FIGS. 1–3. Mid plate 400 fits around the exterior of a spherical sensor block, such as spherical sensor block of related application 11/004184, and gas plate assemblies 404-1 to 404-M, using the above described nozzles, direct gas at an exterior surface of spherical sensor block 302 to rotate and hold sensor block 302 into any desired location. It is understood that mid-plate 400 is designed to rotate, stop and hold any spherically shaped apparatus. Mid-plate 400 with gas plate assemblies 404-1 to 404-M is calibrated to provide a designated amount of gas to rotate sensor block 302. The amount of gas, size of nozzle, shape of nozzle, flow of gas (pulsed, steady or the like), the surface finish of the spherical apparatus are all factors used for design purposes. FIG. 5 below illustrates an application of a mid-plate such as mid-plate 400.

FIG. 5 illustrates one embodiment of an inertial navigation system (INS) shown generally at 500. INS 500 includes an inertial measurement unit or spherical sensor block 502 with a mid-plate 550 that rotates sensor block 502 into any rotational location. In one embodiment, mid-plate 550 is as described above with respect to mid-plate 400 of FIG. 4. INS 500 further includes a first section 562 and a second section 560 that combine to form an outer shell for sensor block 502 that suspends sensor block 502 in a near frictionless environment. As described in related application 11/004184. INS 500 is supported by support structure 580 having a frame 584 and a base 582. Mid-plate 550 and first and second sections 560 and 562 are secured together and mounted on support structure 580 for stability.

Mid-plate 550 includes a plurality of gas plate assemblies 504. Only three gas plate assemblies 504 are visible in this illustration. A fourth gas plate assembly is employed and is located behind spherical sensor block 502. In one embodiment, gas plate assemblies 504 are as described above with respect to FIGS. 1–4.

Each gas plate assembly 504 includes a plurality of gas nozzles as described above with respect to FIGS. 1–4. Sensor block 502 is floated by pressurized gas and is rotated by mid-plate 550.

In operation, the angular position of the sensor blocks described in FIGS. 1–5 above are controlled by angled gas nozzles. These gas nozzles are directed at the sensor block surface to impart tangential loads. A control system turns the nozzles on and off to reposition the sensor block and hold it at precise angles.

In one embodiment gas nozzles are turned on and off using automated feedback control from a position sensor and feedback amplifier. In another embodiment, the gas is pulsed to control the rotation. Other ways such as having the gas always on and rotating the gas nozzles is contemplated and within the scope of the invention. In one embodiment, the gas nozzles include any combination of round, fan shapes, angled heads, spray heads or the like. The gas nozzles are made of any suitable material such as copper, steel, aluminum, plastic or the like.

In other embodiments, the amount of torque created on the sensor blocks described in FIGS. 1–5 above, by the application of pressurized gas from gas nozzles, is controlled by the surface texture of a sensor block. Differing textures change the air friction coefficient for the sensor block such that a smoother surface texture results in less torque generated by the gas nozzles, while rougher surface textures result in more torque generated by the gas nozzles. In one embodiment, the sensor block surface is polished and smooth. In one embodiment, the sensor block surface is texturized. In one embodiment, the sensor block surface has a sandpaper texture. In one embodiment, the sensor block surface has the texture of 400 grit sandpaper. In one embodiment, a texturized surface is created from a reference pattern applied to the surface of the sensor block as described in the '7167 Application, herein incorporated by reference. To aid in the rotation of the sensor block, the amount of additional torque required from the application of a surface texture is a function of the size and weight of a sensor block, and the roughness of the surface texture, which one skilled in the art could readily determine.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An inertial navigation system, comprising:
    a gas supported sensor block that is adapted to rotate in three dimensions in a near frictionless environment;
    a plurality of jet plates adapted to receive up to two pairs of opposing pneumatic nozzles; and
    a plurality of electronically controlled pneumatic valves that provides and controls gas to the opposing pair of pneumatic nozzles;
    wherein each pair of opposing pneumatic nozzles is directed at an exterior surface of the sensor block and uses gas flow to move and hold the sensor block in any rotational location without physically touching the sensor block.

2. The system of claim 1, wherein the opposing pairs of pneumatic nozzles operate in three orthogonal axes.

3. The system of claim 1, wherein the gas supported sensor block is spherical in shape.

4. The system of claim 1, further comprising a controller coupled to the valves.

5. The system of claim 1, wherein the pneumatic nozzles are round in shape.

6. The system of claim 1, wherein the pneumatic nozzles are oval in shape.

7. The system of claim 1, wherein the electronically controlled pneumatic valves are solenoid actuated pneumatic valves.

8. The system of claim 3, wherein the plurality of jet plates is mounted in a mid-plate that operates around the circumference of the spherical sensor block.

9. The system of claim 1, wherein the gas supported sensor block has a smooth surface.

10. The system of claim 1, wherein the gas supported sensor block has a textured surface.

11. The system of claim 10, wherein the textured surface is a sandpaper texture.

12. The system of claim 11, wherein the sandpaper texture is a 400 grit sandpaper texture.

13. The system of claim 10, wherein the textured surface is created by a reference pattern.

14. The system of claim 13, wherein the reference pattern is a random pattern.

15. The system of claim 13, wherein the reference pattern is a pseudo-random pattern.

16. The system of claim 13, wherein the reference pattern is a pre-defined pattern.

17. The system of claim 1, wherein the plurality of jet plates is comprised of a first jet plate having two pairs of opposing nozzles operating in two orthogonal axes.

18. The system of claim 17, wherein the plurality of jet plates is further comprised of a second jet plate having a single pair of opposing nozzles operating in a third axis orthogonal to the two orthogonal axes.

19. A gas jet control apparatus, comprising:
    three pairs of opposing pneumatic nozzles, wherein each of the three pairs of opposing pneumatic nozzles operates in axes orthogonal to each other;
    wherein the three pairs of pneumatic nozzles receive gas from electronically controlled pneumatic valves;
    wherein the gas is provided to rotate and hold an inertial measurement unit at any rotational angle without physically contacting the inertial measurement unit;
    wherein the inertial measurement unit is floated in a near frictionless environment;
    a first jet plate adapted to receive two of the pairs of opposing pneumatic nozzles; and
    a second jet plate adapted to receive a third pair of opposing pairs of pneumatic nozzles.

20. The apparatus of claim 19, wherein the pneumatic nozzles are round shaped.

21. The apparatus of claim 19, wherein the pneumatic nozzles are oval shaped.

22. The apparatus of claim 19, wherein the inertial measurement unit is spherical in shape.

23. The apparatus of claim 19, wherein the electronically controlled pneumatic valves are solenoid actuated pneumatic valves.

24. The apparatus of claim 22, wherein the gas jet control apparatus is a mid-plate that operates around a circumference of the spherical inertial measurement unit.

25. The system of claim 19, wherein the inertial measurement unit has a smooth surface.

26. The apparatus of claim 19, wherein the inertial measurement unit has a textured surface.

27. The system of claim 26, wherein the textured surface is a sandpaper texture.

28. The system of claim 27, wherein the sandpaper texture is a 400 grit sandpaper texture.

29. The system of claim 26, wherein the textured surface is created by a reference pattern.

30. The system of claim 29, wherein the reference pattern is a random pattern.

31. The system of claim 29, wherein the reference pattern is a pseudo-random pattern.

32. The system of claim 29, wherein the reference pattern is a pre-defined pattern.

33. A method of controlling rotation of an inertial measurement unit, the method comprising:
    floating an inertial measurement unit in a near frictionless environment;
    directing opposing pairs of pneumatic nozzles at an exterior surface of the inertial measurement unit in three orthogonal axis; and
    driving gas through one or more of the opposing pairs of pneumatic nozzles and moving the inertial measurement unit in a desired manner within three dimensions.

34. The method of claim 33, further comprising driving gas through one or more of the opposing pair of pneumatic nozzles and moving the inertial measurement unit based on one or more signals received from a controller.

35. The method of claim 33, further comprising holding the inertial measurement unit in a specific location using gas flow through one or more of the opposing pairs of pneumatic nozzles.

36. The method of claim 35, further comprising holding the inertial measurement unit in a specific location based on one or more signals from a controller.

37. The method of claim 34, wherein the one or more received signals indicate an amount and flow of gas to the opposing pairs of pneumatic nozzles via electronically controlled pneumatic valves.

38. The system of claim 33, wherein the inertial measurement unit has a smooth surface.

39. The apparatus of claim 33, wherein the inertial measurement unit has a textured surface.

40. The system of claim 39, wherein the textured surface is a sandpaper texture.

41. The system of claim 40, wherein the sandpaper texture is a 400 grit sandpaper texture.

42. The system of claim 39, wherein the textured surface is created by a reference pattern.

43. The system of claim 42, wherein the reference pattern is a random pattern.

44. The system of claim 42, wherein the reference pattern is a pseudo-random pattern.

45. The system of claim 42, wherein the reference pattern is a pre-defined pattern.

* * * * *